Dec. 30, 1941.  N. S. REYNOLDS ET AL  2,267,994
SEAL
Filed Sept. 14, 1939
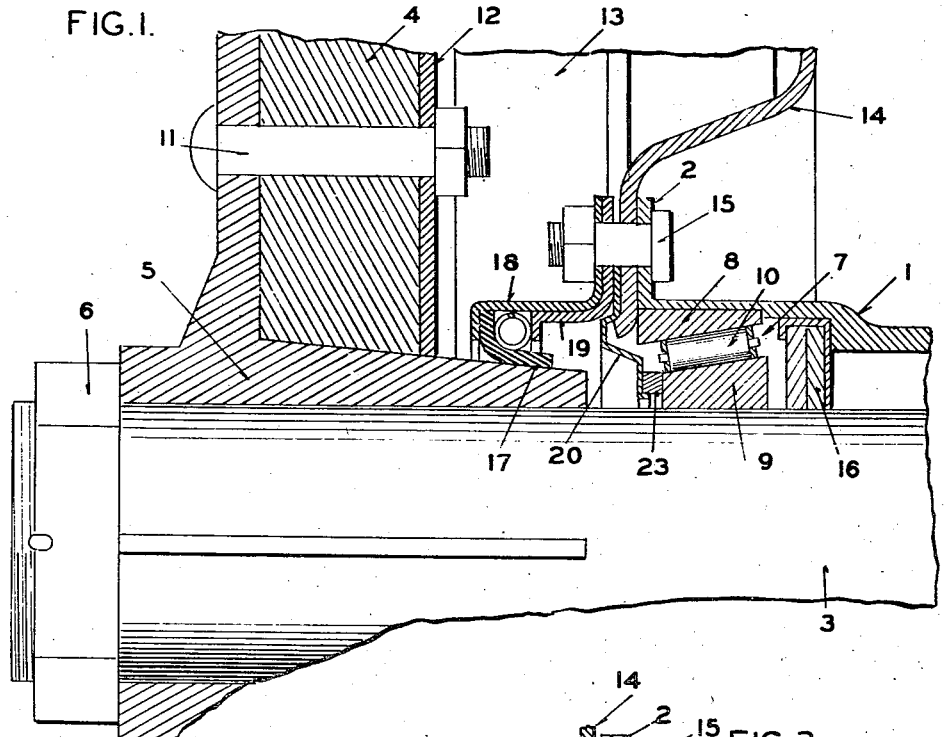
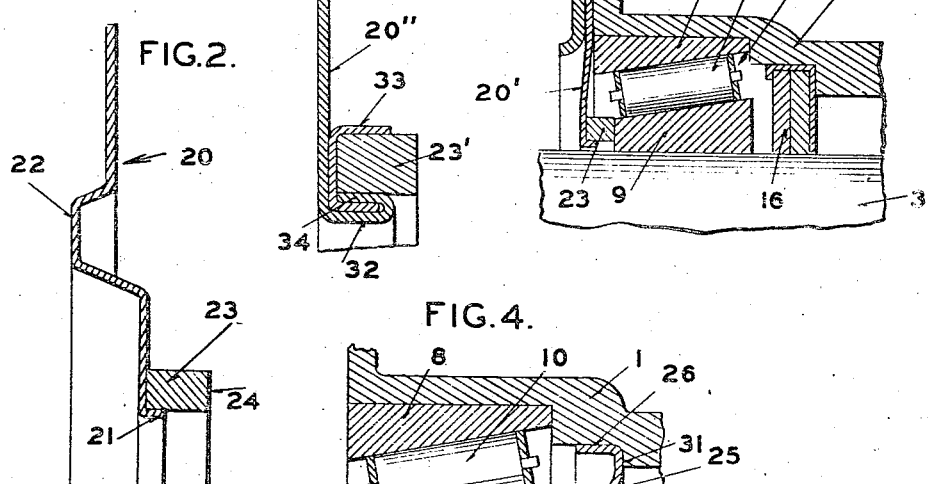
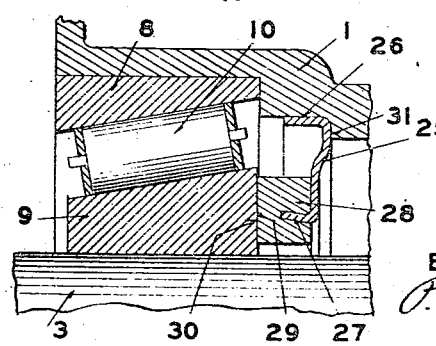
INVENTORS
NOEL S. REYNOLDS
OTTO F. BARTLING
BY
P. H. Lamphere
ATTORNEY Patented Dec. 30, 1941

2,267,994

UNITED STATES PATENT OFFICE 2,267,994

SEAL

Noel S. Reynolds and Otto F. Bartling,
St. Louis, Mo.

Application September 14, 1939, Serial No. 294,820

1 Claim. (Cl. 286—11)

Our invention relates to seals and more particularly to a seal for retaining lubricant in the bearing of a rear axle of a vehicle.

One of the objects of our invention is to provide a seal for a rear axle bearing which is adapted to be secured to the axle housing assembly and when in operative position will so engage and seal against the end surface of the portion of the axle bearing which rotates with the axle that lubricant will be prevented from coming out of the bearing.

Another object of our invention is to produce a seal for a rear axle bearing of a vehicle which will be simple in construction and, therefore, cheap to manufacture, and which will be easy to install and will perform an efficient sealing action over a long period of time.

Other objects of our invention will become apparent from the following description taken in connection with the accompanying drawing, in which Figure 1 is a cross-sectional view of a rear axle construction for a motor vehicle showing my invention embodied therein for preventing lubricant from coming out of the axle bearing; Figure 2 is an enlarged cross-sectional view of the seal; Figure 3 is a sectional view showing a modification; Figure 4 is a sectional view showing a modified construction for association with the inner end of the bearing; and Figure 5 is a sectional view showing a special construction for holding the sealing ring on the annular disc.

Referring to the drawing in detail and particularly to Figures 1 and 2, numeral 1 indicates a rear axle housing which is formed with a flange 2 at its outer end. The axle 3 extends through the housing and drives the wheel 4 which has its hub 5 keyed to the axle and secured in place by the nut 6. A bearing 7 is provided at the outer end of the housing for the axle, this bearing comprising a race 8 pressed in the end of the housing, a race 9 pressed on the axle and a plurality of rollers 10 cooperating with the races.

The wheel 4 has secured thereto by bolts 11, the usual brake drum 12 and cooperating with the brake drum are the brake shoes 13 (one only being shown) supported on a backing plate 14 which encloses the open side of the drum and is secured to the flange 2 of the housing by spaced bolts 15 (one only being shown). The housing 1 and the axle have associated therewith a seal 16 which prevents the thin gear oil or grease in the differential from reaching the bearing and thinning the heavy grease which completely surrounds said bearing. In accordance with present construction there is also provided a seal 17 of leather for preventing lubricant from passing outwardly from the bearing. This seal is held between two annular members 18 and 19 which are clamped to the housing and backing plate by the bolts 15. Much trouble has been experienced from this latter seal 17 as it has been found to be almost impossible to have it operate efficiently over any long periods of time due to the leather thereof becoming smooth from wear and also the poor sealing surface on the hub 5 which is not smoothly finished.

In accordance with our invention we have produced a new seal to accomplish the work of seal 17 and which, if desired, can be mounted in operative position without the necessity of eliminating the former. As shown in Figure 2, the seal comprises a thin annular disc 20 preferably made of metal such as brass or bronze or sheet metal. The thickness of the disc is shown exaggerated in the drawing. In a particular metal such as brass it is about eight-thousandths of an inch. The outer portion of the disc is imperforate and the inner peripheral edge is turned over to form an axially extending annular flange 21. The disc is formed with an annular corrugation 22 which increases the axial flexibility of the disc and also permits the seal to be properly installed as will become apparent. Snugly telescoped over the flange 21 is a sealing ring 23 which may be constructed of different types of materials that have a good wear factor. In the seal shown we prefer that the material be a phenolic condensation product such as "Bakelite," but other material such as brass, fibre, carbon or metal composition may be employed. The end surface 24 lies in a plane at right angles to the axis of the seal and is formed smooth. In order to assist the flange 21 in holding the sealing ring 23 in place, a suitable adhesive such as glue is employed between the ring and the disc.

In mounting the seal in operative position, the wheel is removed and also the seal 17 and members 18 and 19 after removal of the nut of bolt 15. The seal is now placed in position as shown in Figure 1. The diameter of the flange 21 of the seal is about one-sixteenth of an inch greater than the diameter of the shaft in order to permit the lateral play of the axle in its bearing to take place without injuring the seal. The smooth surface 24 abuts against the smooth surface of the outer end of race 9 of the axle bearing 7 which surface is normal to the axis of the axle. The corrugation 22 accommodates the inner edge of the backing plate 14 which, as presently constructed, is curved as shown. The seal is so constructed that the axial distance between the outer peripheral portion of the disc and the surface 24 of the sealing ring is slightly greater than the axial distance between the outer surface of the backing plate and the outer end surface of race 9. Thus when members 18 and 19 of seal 17 are replaced and the nut of bolt 15 again tightened to clamp the seal in place, the outer peripheral portion of the disc will be flexed axially with respect to the inner peripheral portion. Since the metal is resilient, this deformation of the disc will cause the sealing ring to be held tightly against the end of race 9 and result in an efficient sealing action and grease cannot, therefore, pass out of the bearing, notwithstanding this grease may become thinned by a partial failure of seal 16 to prevent gear oil from entering the bearing. Also, since the sealing surfaces lie in a plane at right angles to the axis of the shaft, any wear of bearing 7 permitting the axle to move laterally will not affect the seal as would be the case in the present seal 17 wherein the sealing surfaces are concentric to the axis of the axle.

The seal just described is specially constructed for replacement use. In Figure 3 we have shown our invention embodied in a seal for installation at the factory. The seal is constructed in the same manner as previously described except that the annular disc 20' is not provided with a corrugation as such is not necessary to accommodate the curved inner edge of the backing plate. As shown, the outer peripheral portion of disc 20' is clamped between the backing plate 14 and flange 2 of the housing 1. The disc is so constructed that when the seal is in position, the outer peripheral portion of the disc will be flexed axially with respect to the inner peripheral portion to thus force the surface 24 of the sealing ring into tight sealing engagement with race 9 of the bearing.

Referring to Figure 4, there is disclosed a modified seal construction designed for association with the inner end of the bearing race 9. This seal takes the places of seal 16 shown in Figures 1 and 3 and has for its purpose preventing the thin gear oil or grease in the differential from passing to the bearing and thinning the special heavy grease employed for lubricating this bearing. The housing, bearing and shaft are all indicated by the same numerals as previously used.

The seal comprises an imperforate annular disc 25 having an outer flange 26 and an inner flange 27, both extending in the same direction. Molded on the inner flange is a sealing ring 28 of a phenolic condensation product such as "Bakelite" which has a flat end surface 29 for cooperation with the inner flat end surface 30 of the bearing race 9 secured on the axle 3. In order that the ring may be well anchored on the disc, the flange 27 extends slightly at an angle away from the axis of the disc. The disc is quite thin and the inner portion depressed with respect to the outer portion in order that said outer portion may yield slightly in the general plane of the disc. The dimensions of the seal are such in relation to the housing 1 that it can be forced into position against the shoulder 31 and maintained there by its inherent resiliency. The disc is also so designed that the ring will be resiliently held against the end surface of the race 9, thus establishing a seal preventing leakage of oil into the bearing or leakage of grease out of the bearing.

Referring to Figure 5, there is disclosed another means of holding the sealing ring to the disc. The inner portion of the disc 20'' is provided with a flange 32 and positioned on this flange is an annular holding member 33 U-shaped in cross section and receiving the sealing ring 23'. The holding member is held on the flange by having a portion 34 of said flange turned over the inner leg. In assembling the parts, the holding member 32 is placed on the flange and the portion 34 turned partially thereover. Next, the ring is pushed into position, thereby bending the portion 34 into its final position where both the ring 23' and holding member 33 will be held to the flange of the disc.

Being aware of the possibility of modifications in the particular structures herein described without departing from the fundamental principles of our invention, we do not intend that its scope be limited except as set forth by the appended claim.

Having fully described our invention, what we claim as new and desire to secure by Letters Patent of the United States is:

A removable seal for cooperation with a rotatable member having thereon and rotatable therewith an annular flat surface lying in a plane at right angles to the axis of the rotatable member and with a fixed member through which the rotatable member extends to thus prevent lubricant from passing between the rotatable member and the fixed member, said seal comprising a thin metallic annular disc adap'ed to be positioned around the shaft and to have its peripheral portion detachably connected to the fixed member, the inner marginal portion of said disc being provided with an integral axially extending flange projecting when the seal is in position toward the annular flat surface of the rotatable member, a separate annular sealing ring having a smooth end surface for engagement with the flat annular surface on the rotatable member, a separate annular holding member for the sealing ring, said holding member being of U-shaped cross-section with its side walls positioned substantially concentric with the axis of the rotatable member and receiving said sealing ring between said side walls with the smooth end surface thereof exposed, and means for securing a side wall of said holding member to the flange in concentric relation so that the exposed surface of the ring is axially spaced from the disc, said disc being so formed that when attached to the fixed member the inner portion of the disc will be so flexed axially with respect to the outer portion that the exposed smooth end surface of the sealing ring will be resiliently held in tight sealing engagement with the annular flat surface on the rotatable member.

NOEL S. REYNOLDS.
OTTO F. BARTLING.